Oct. 1, 1946.      W. P. MASON      2,408,436
MULTIPLEX COMPRESSIONAL WAVE SYSTEM
Filed Oct. 24, 1942      4 Sheets-Sheet 1
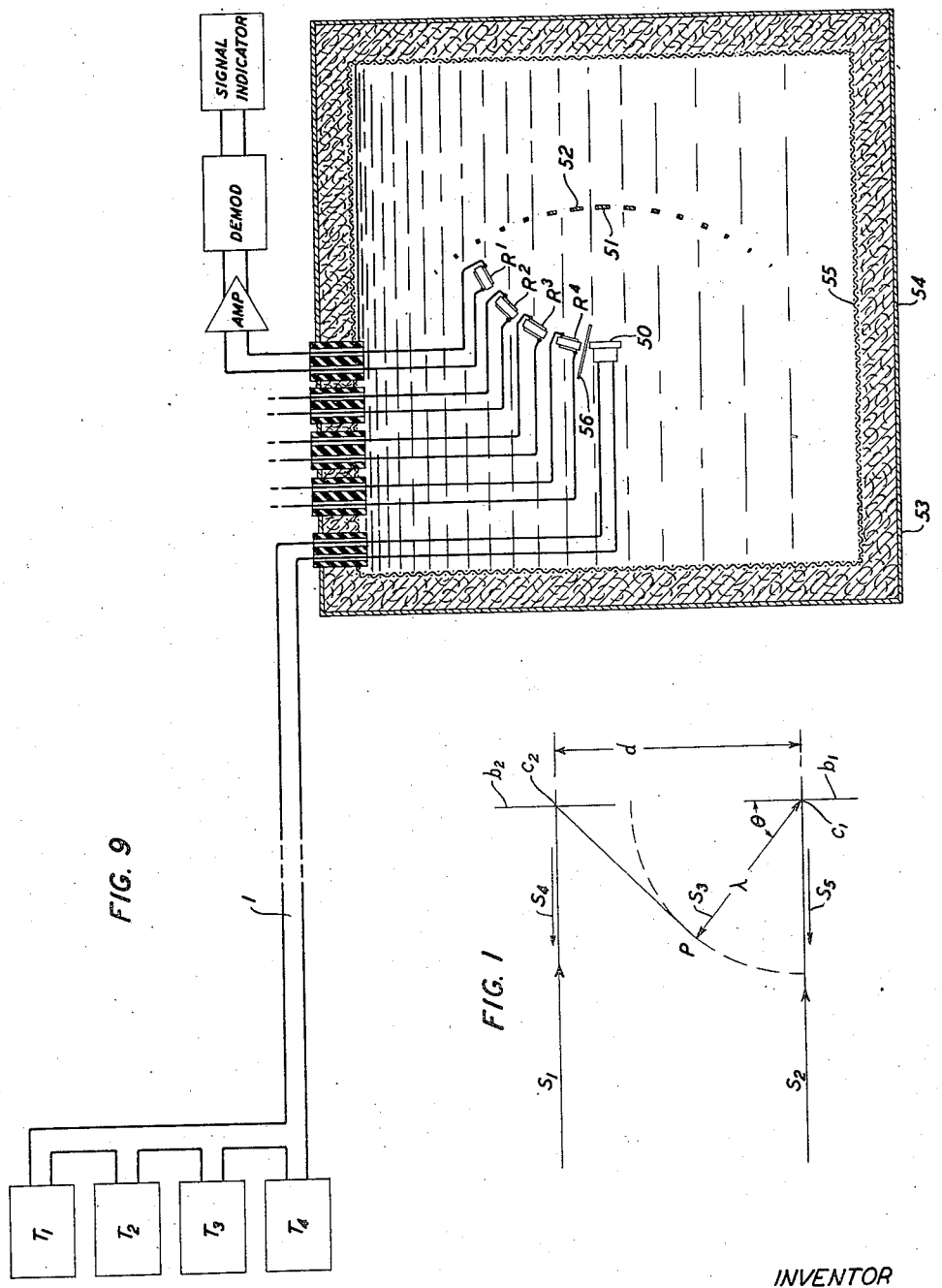
INVENTOR
W. P. MASON
BY
E. V. Griggs
ATTORNEY

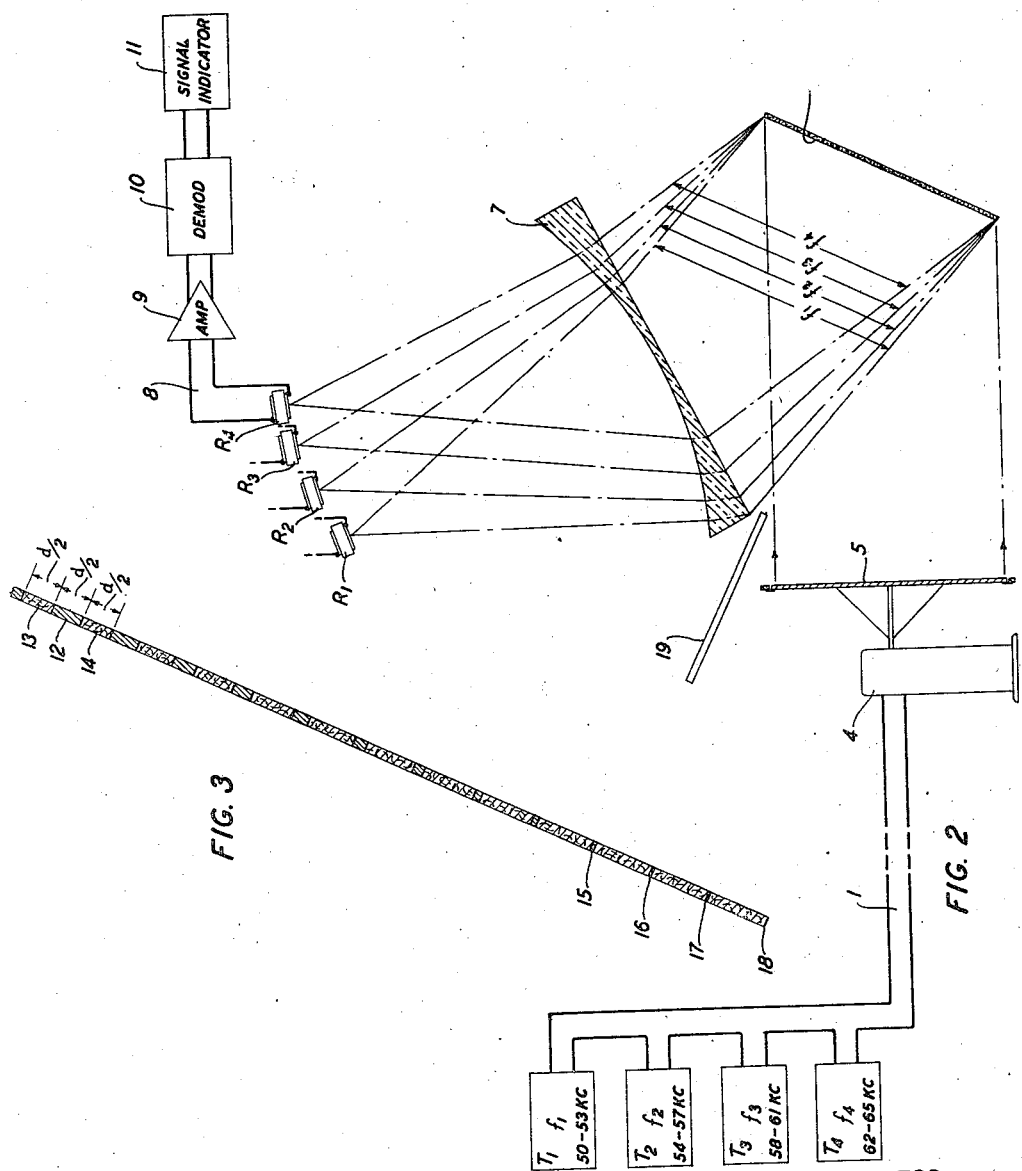

Oct. 1, 1946.                W. P. MASON                2,408,436
                MULTIPLEX COMPRESSIONAL WAVE SYSTEM
                  Filed Oct. 24, 1942      4 Sheets-Sheet 3
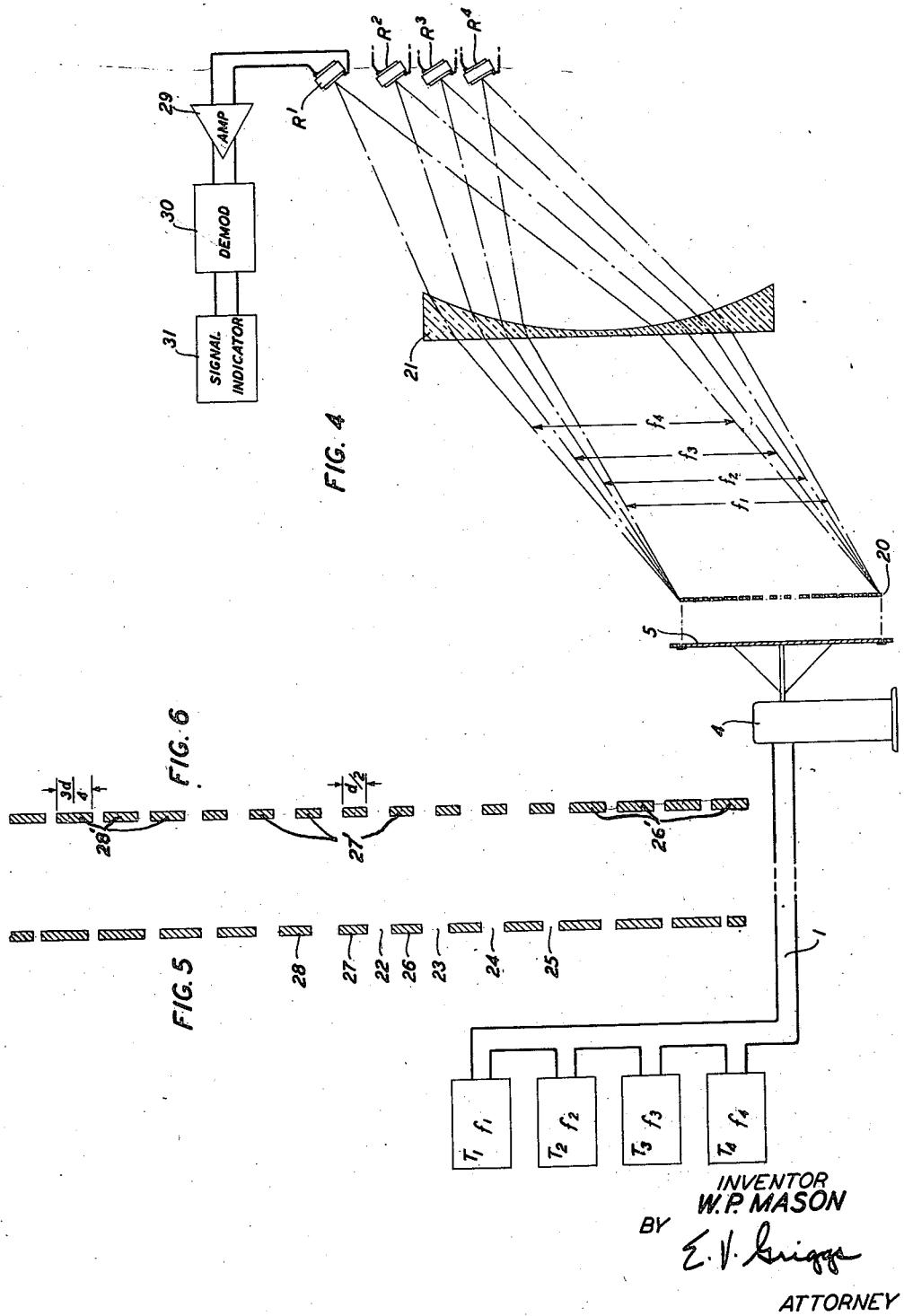
INVENTOR
*W. P. MASON*
BY
*E. V. Griggs*
ATTORNEY

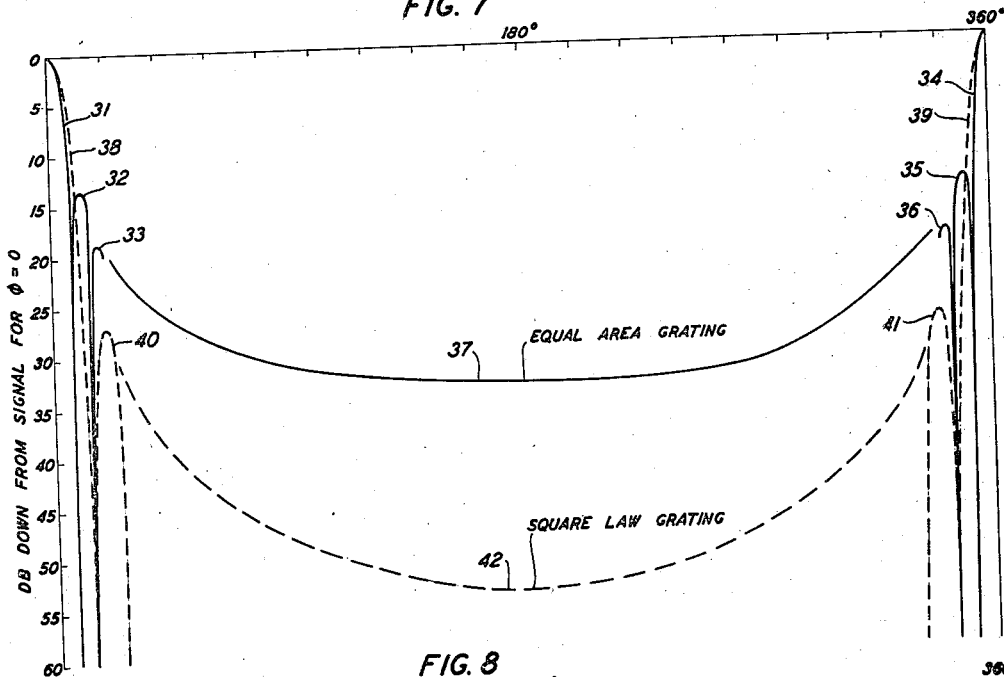
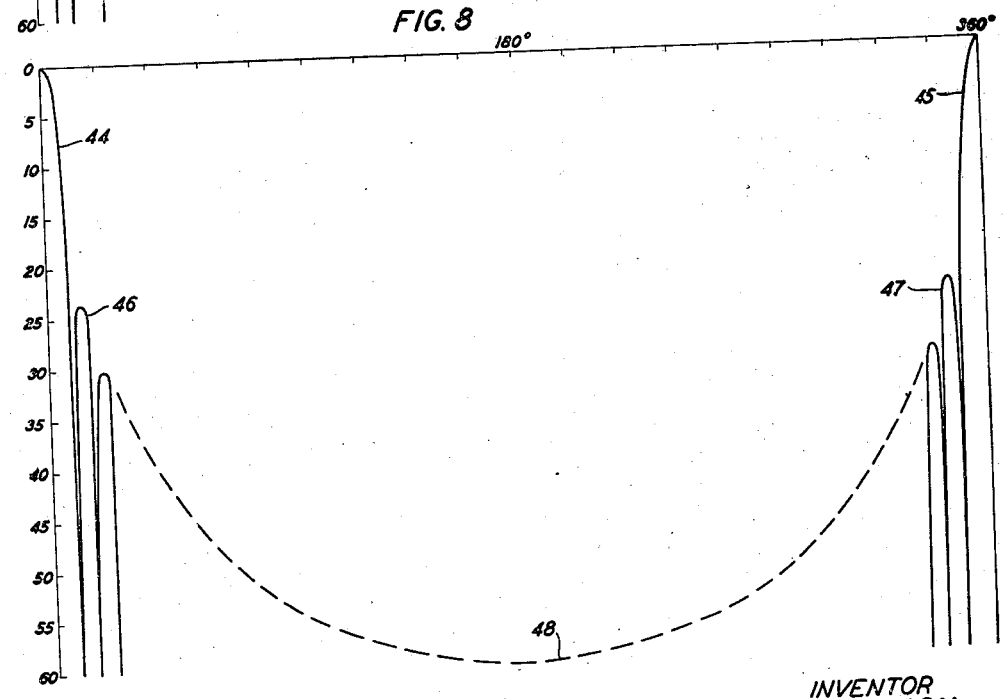

UNITED STATES PATENT OFFICE 2,408,436

MULTIPLEX COMPRESSIONAL WAVE SYSTEM

Warren P. Mason, West Orange, N. J., assignor to Bell Telephone Laboratories, Incorporated, New York, N. Y., a corporation of New York Application October 24, 1942, Serial No. 463,279

11 Claims. (Cl. 178—44)

This invention relates to multiplex channel transmission systems and more particularly to multiplex compressional wave systems employing diffraction gratings in compressional wave filters for separating the energies of the various channels.

An object of the invention is to improve the selectivity attainable in wave filters at relatively high frequencies.

Another object is to increase the frequency limits of effective compressional wave filters.

A further object of the invention is to decrease the number of elements of a diffraction grating required to give a definite discrimination.

Still another object of the invention is to increase the major lobe directivity of a diffraction grating filter with reference to subsidiary or minor lobes.

Diffraction gratings are well known especially in the field of optics. They depend upon the fact that a plane wave front may be broken up into narrow striations which act as new sources of waves that reinforce each other in definite directions, depending upon the spacing of the sources and the wave-length of the energy. Accordingly, as the wave-length varies the direction of reinforcement for a given grating also varies with frequency with the result that incident waves of a wide band of frequencies are broken up by the grating into components dispersed at different angles. It is, therefore, possible by means of a diffraction grating to separate a wave of one frequency or of one band of frequencies from one of different frequency characteristics.

Two types of diffraction gratings have been used. In the reflection grating parallel bars having reflecting surfaces and separated by non-reflecting absorbing areas return the wave energies to reinforce each other along lines on the same side of the grating as the source. The other type of diffraction grating, the transmission grating, comprises parallel energy-absorbing or reflecting bars and intervening slots through which the wave energies pass to reinforce each other along lines on the opposite side of the grating. These lines at which the reinforcement occurs lie at angles with respect to the plane of the grating face which depend upon the wave frequency.

In both types of grating, the distance between the centers of the elements whether reflecting elements or transmission elements or absorption elements is uniform. Assuming elements of equal lengths, the areas of wave energy utilized, that is, the areas of the slots in the case of the transmission type or the areas of the reflecting bars in the case of the reflecting type are, in the optimum condition for maximum effect, equal to the areas not utilized. In other words, in the transmission grating maximum effects are obtained when the slots have faces which are equal in width to the faces of the intervening bars. In the reflection grating maximum effects are obtained when the widths of the reflecting surfaces of the bars are each equal to the widths of the intervening absorbing strips. Such diffraction gratings cause wave energy of a given frequency to reinforce in several directions, the angles of which with reference to the plane of the energy exit face of the transmission grating may be simply expressed by:

$$\cos^{-1}\frac{\lambda}{d}, \cos^{-1}\frac{2\lambda}{d} \text{ etc.} \qquad (1)$$

where $\lambda$ is the wave-length of the energy in the medium beyond the grating and $d$ is the distance between centers of slots, that is, the separation of the virtual sources.

The effect of the series of dispersion angles for each frequency is to produce a first order diffraction lobe and higher order diffraction lobes for each individual wave-length. Each order of diffraction tends to present a major lobe and several adjacent minor lobes. It follows that there are a number of angles at which any one of the frequencies appears so that there is a possibility of overlap of a major lobe of a wave of one frequency with a minor lobe of another frequency. If compressional wave responsive devices, which are non-selective as to frequency, are to be used, it is obviously desirable to reduce the minor lobes as much as possible so as to increase the amplitude differentiation between these unwanted lobes and the desired major lobes. Applicant has discovered that by varying areas of the grating elements in such manner that a larger percentage of the wave energy is derived from a central element and a smaller percentage from a marginal element, the directivity of the grating for a particular frequency may be improved in the sense that the ratio of the response at the major lobe to that obtainable in other directions is increased. Moreover, the absolute energy of the major lobe is not substantially diminished so that the gain in discrimination is attained principally by reduction of minor lobes. Various relationships of the grating areas may be employed but in each the area of the central element should be limited, as has already been suggested, to a magnitude not greater than the area of the contiguous void elements. According to one relationship which has been found advantageous the widths of the elements may vary in accordance with the square law so that the widths of the individual elements increase passing from the outer element toward the center in accordance with the square of their distances from the outer margin of the grating.

Diffraction gratings of the type described may be employed to differently diffract the individual components of a wide band of compressional waves. If the beam of waves, as a whole, encompasses a considerable cross section area overlap of the differently refracted beams may be markedly reduced by the use of a converging lens. The individual frequency or the subband frequency beams so separated and focussed at different positions may then be impressed upon compressional wave responsive devices placed at the respective foci. This, therefore, affords a means of effectively separating the different frequency components of a compressional wave band consisting of extremely short waves.

The invention may be best understood by reference to the following detailed specification taken in connection with the accompanying drawings in which:

Fig. 1 is a diagram to assist in explaining the principles of the invention;

Fig. 2 illustrates diagrammatically the circuit and apparatus of multiplex carrier wave system employing compressional waves;

Fig. 3 illustrates on an enlarged scale the design of a reflection type diffraction grating employed in the system of Fig. 2;

Fig. 4 illustrates a modification of the system of Fig. 2 in which a transmission type diffraction grating is employed;

Fig. 5 illustrates on an enlarged scale details of the diffraction grating of Fig. 4;

Fig. 6 illustrates a modification of the grating of Fig. 5;

Fig. 7 is a graph of directional response of a compressional wave filter system showing the improvement attained by the use of one species of the invention;

Fig. 8 is a similar graph showing the result obtained with the use of another modification; and Fig. 9 illustrates a system in which a concave reflection grating replaces both the plane grating and the converging lens of the preceding systems.

Referring to Fig. 1 let $b_1$ and $b_2$ represent two proximate reflecting bars of a diffraction grating the centers $c_1$ and $c_2$ of which are spaced a distance $d$. Two rays $S_1$ and $S_2$ from a plane wave front source of wave-length $\lambda$ are incident simultaneously upon the two bars at their central points. Assuming that $c_1$ be considered as a new point source, its energy at one cycle later will be spread out over a circle whose center is $c_1$ and whose radius is $\lambda$. Accordingly, a line from $c_2$ passing tangent to the circle as at P will indicate a locus of equal phase effects from the two centers $c_2$ and $c_1$. Denoting by $\theta$ the angle which the ray $c_1P$ makes with reference to the plane of the grating $b_1$, $b_2$ one obtains the well-known relationship $$\frac{\lambda}{d} = \cos \theta \quad (2)$$

This determines the direction of the first order lobe of the diffracted beam. By a similar reasoning the relationships $$\frac{2\lambda}{d} = \cos \theta_2 \quad (3)$$

and $$\frac{3\lambda}{d} = \cos \theta_3 \quad (4)$$

may be ascertained to indicate the directions of the second and third order lobes, respectively. It will be apparent therefore that the wave front of the first order diffraction will be directed as is indicated by the ray $S_3$ connecting points $c_1$ and P the wave fronts of succeeding orders of diffraction will be oriented in more upward directions in Fig. 1, in accordance with the magnitudes of $\theta_2$ and $\theta_3$.

The analysis presented is for the case in which the diffraction grating has a plane facial surface perpendicular to the incident rays. In that instance the directly reflected rays $S_4$ and $S_5$ are returned along the paths of incident rays $S_1$ and $S_2$. It will be apparent, therefore, that the angular separation between the directly reflected rays which include components of all frequencies and the first order diffracted beam for any particular frequency or narrow band of frequencies is measured by $90° - \theta$. That separation may be made as great as desired by suitably relating $d$ and $\lambda$.

If it be desired for any reason to orient the grating at a different angle than the perpendicular position to incident rays the directly reflected rays corresponding to $S_4$ and $S_5$ will of course return along parallel paths determined by the well-known principle that the angle $\Phi$ of reflection is equal to the angle of incidence. The diffracted beams will be sent out from the diffraction grating at still different angles determined by the principle presented in the analysis of Fig. 1 that the energies from the various new centers are in phase coincidence in a particular direction. The direction of the first order of diffraction will accordingly be separated from that of the directly reflected beam by an angle $\beta_1$ so that with reference to the plane of the grating face the angle of the beam of the first order of diffraction will be $[90° - (\Phi \pm \beta_1)]$, that of the second order diffraction beam $[90° - (\Phi \pm \beta_2)]$, etc.

Referring to Fig. 2, $T_1$, $T_2$, $T_3$, $T_4$ illustrate, respectively, four individual transmitting channels of a multiplex carrier wave system. As indicated these channels may each extend over a frequency range of 3 kilocycles, the four channels as a whole lying within the band of 50 to 65 kilocycles. The four transmitters, $T_1$, $T_2$, $T_3$, and $T_4$ may be connected in series to a transmission line 1 terminating at a remote station in an electric wave to sound wave transducer 4 having a diaphragm or sound radiating element 5 from which emanates a beam of high frequency compressional waves corresponding in frequency and in their modulation to the electric wave received over the transmission line 1. The beam of compressional waves produced by the diaphragm 5 and including components of the various frequencies of the electric waves transmitted over the line 1 is permitted to fall upon a reflection type diffraction grating 6 positioned in the path of the beam. The diffraction grating 6, the structure of which will be explained subsequently, serves to diffract the mid-frequency components $f_1$, $f_2$, $f_3$, and $f_4$ of the four bands at the different angles indicated in the drawings. In the path of the diffracted beams is placed a converging lens 7 of planoconcave type and which may be either cylindrical or spherical depending on whether it is desired to focus the beams along lines or at points. The lens 7 may consist of any suitable homogeneous solid material and preferably of some plastic material such as Tenite II (cellulose acetate butyrate) isobutyl methacrylate, or vinyl chloride. At the respective foci of the four bands are positioned compressional wave responsive devices $R_1$, R₂, R₃, and R₄. The devices R₁, R₂, R₃ and R₄ are illustrated diagrammatically as of the piezo-electric type and each may be associated as is shown in the case of R₄ with suitable translating and indicating apparatus. Device R₄ is, for example, connected by an electric circuit 8 to the input terminals of an amplifier 9, the output of which is connected to a demodulator 10 which in turn supplies speech or other low frequency signals such as originated at transmitter T₄, to the signal indicator 11, which may be a telephone receiver, a loud-speaker or any suitable signal indicating or recording appliance. It will therefore be apparent that the four individual messages transmitted over the line 1 as modulated carrier current may be separated and supplied to individual terminal circuits by the mechanical wave selecting system comprising sound producer 5, diffraction grating 6, compressional wave lens 7 and compressional wave responsive devices R₁, R₂, R₃, and R₄.

The beams of frequency $f_1$, $f_2$, $f_3$, $f_4$ have been dealt with on the basis of the mid-band frequency of each beam. Since each band encompasses a range of 3000 cycles the limiting frequency rays will diverge slightly from the central frequency range, but the amount of divergence over distances which are not excessive will not cause too great a departure from the position of the mid-band frequency ray to substantially affect the operation of the system.

The transverse dimensions of the sound wave source 5 for effective directive transmission should be relatively large compared with a wavelength of the emitted energy. The diffraction grating should therefore encompass a space great enough to receive efficiently substantially all of the directive beam from the diaphragm. It follows that the supersonic beam will have a fairly large cross section in space. This situation is indicated in Fig. 2 in which the marginal rays of the bands $f_1$, $f_2$, $f_3$, $f_4$ are indicated. The lens 7 should be given such dimensions and should be so placed with reference to the grating that the foci at which the bands respectively converge may be sufficiently separated to enable the compressional wave responsive devices R₁, R₂, R₃, R₄ to be given practicable dimensions and so insure that the zone which each responsive device occupies is reasonably free from energies of the unwanted bands. The orientation of the reflection grating performs an additional function in enabling the compressional wave receiving apparatus to be placed on the same side of the diffraction grating as is necessary in the case of the reflection type without interfering in position with the compressional wave beam emitter 4, 5 or being directly affected thereby. If necessary a sound baffle 19 may be interposed to prevent transmission directly from diaphragm 5 to compressional wave receiving devices R₁, R₂, R₃, R₄. In general, however, these compressional wave devices are preferably made as directive as possible with respect to their receptivity so as to reduce the effect of waves from extraneous sources.

Fig. 3 shows in more detail the structure of part of the reflection type diffraction grating 6. As illustrated, the grating consists of alternate compressional wave reflecting bars and intermediate compressional wave absorbing strips. The bars may, for example, consist of highly polished steel. For most efficient reflection, the steel bars should have a thickness of about one-quarter wavelength. Although for convenience in illustration a much fewer number of bars and absorbing strips is shown in Fig. 3, in an actual grating there should be preferably as many as fifty reflecting bars and a structure of two hundred bars is more effective. The central reflecting bar 12 may have a width $$\frac{d}{2}$$

about equal to that of the adjacent absorbing strips 13 and 14. Succeeding bars should be so positioned that their centers are at a distance of approximately $d$ from the center of the nearest bar. Their widths, however, progressively decrease in accordance with a square law distribution so that beginning with the outermost bar 18 which may have an area A, the area of the next bar 17 may be 4A, that of bar 16, 9A, etc. In an alternative arrangement the widths may be varied in a sinusoidal manner so that the width of the bar 12 will be the maximum width of any of the bars and that of an imaginary bar at a distance $d$ beyond 18 will be zero, the distance between the centers of the imaginary bar and bar 12 corresponding to 90 degrees of the sine function which determines the bar areas.

Referring to Fig. 4 transmitters T₁, T₂, T₃ and T₄ which may correspond in every respect to those of Fig. 2 are connected to the line 1 which terminates at a remote point in the electric wave to sound transducer which may be a loud-speaker 4 having a sound-producing diaphragm 5. Beyond the diaphragm is a transmission type compressional wave diffraction grating 20 positioned in the path of the sound beam in the diaphragm 5. The diffraction grating 20 serves to differently diffract the four beams whose mid-frequencies are $f_1$, $f_2$, $f_3$ and $f_4$ as indicated. A focussing lens 21 in every respect similar to the lens 7 of Fig. 2 may serve to focus the individual beams of the four receiving elements R¹, R², R³, R⁴ in the manner already described in connection with the supersonic wave responsive devices of Fig. 1.

As indicated in Fig. 5 the arrangement of the elements of the grating 20 corresponds in a general way to that of the elements of the grating 6 as shown in Fig. 3 with the central opening 22 of the transmission grating 20 corresponding to the central reflecting bar 12 of the reflecting grating 6 and with the successively adjacent openings 23, 24, 25 of the grating of Fig. 5 varying in width in the same manner as the reflecting bars 15, 16, 17 of the grating 6. The absorbing strips 26, 27, 28, etc. of the grating 20 may consist of any suitable material such as, for example, Vistanex (polymerized isobutylene of extremely high molecular weight), or the strips 26, 27, 28, etc. can be made of steel which will reflect the undesired energy away from the direction of the receiving elements R¹, R², R³, R⁴.

The individual compressional wave responsive devices R¹, R², R³ and R⁴ may each be connected to its individual amplifier, demodulator and signal indicator as indicated at 29, 30 and 31.

Fig. 6 discloses a modified form of transmission diffraction grating in which the central half of the structure consists of reflecting or absorbing bars 27' having a width of $$\frac{d}{2}$$

The two outer quarters constituting the remainder of the structure consist of reflecting or absorbing bars 26', 28' each having a width of $$\frac{3d}{4}$$

This distribution of diffracting areas yields a highly directive diffraction effect.

The effect which the unequal area principle of applicant's novel grating produces may be seen upon consideration of the graph of Fig. 7 in which directivity characteristics or responses at a particular frequency are plotted against the phase angle between energies emanating from proximate elements of the diffraction grating. The solid line curve marked "equal area grating" indicates the relative energies at various angles from the condition of phase coincidence to that of 360 degrees separation. In order to make clear the reason for this we may advert once more to the diagram of Fig. 1.

The ray $c_1P$ combines with the energy emanating from $c_2$ because the two are in phase agreement. For rays of all other directions between $c_1P$ and $S_5$ there will be lack of phase agreement and a reduced resultant. This situation is portrayed in Fig. 7 in which the resultant intensities in various directions are plotted in terms of phase difference between the energies emanating from $c_1$ and $c_2$. The directly reversed rays $S_4$ and $S_5$ are in phase agreement. Hence the phase difference of these reversed rays is zero. The phase at point P of the ray $c_1P$ is one full wavelength ahead of the ray just starting from $c_2$ at the instant that the ray $c_1P$ has reached point P. Hence the phase difference is 360 degrees and the ray $c_1P$ indicates the direction of the first order diffraction. In Fig. 7 the solid line shows distribution of energy for a grating having equal area diffracting bars. At the zero degree phase position which exists between the reflected rays $S_4$ and $S_5$ the intensity of the reflected wave is indicated by the major lobe 31. It will be noted that this lobe falls rapidly to a low magnitude but is closely followed by the minor lobes 32 and 33 which are of successively smaller magnitude. At the phase angle 360 degrees there is a major lobe 34 for the first order of diffraction. Corresponding minor lobes 35 and 36 slightly precede the major lobe. Throughout the intervening angular range between lobes 33 and 36 the envelope 37 of the lobe peaks falls to a minimum value approximately 33 decibels below the magnitude of lobes 31 and 34.

The broken line graph portrays the performance of a diffraction filter having fifty elements with the phase areas of the individual elements varied in accordance with the square law. The major lobes 38 and 39 at zero degree and 360 degree phase angles, respectively, are equal in intensity to the major lobes 31 and 34 of the solid line graph. The first minor lobe 40 adjacent the zero phase position and the first minor lobe 41 adjacent the 360 degree division are greatly reduced, their peaks lying some 27 decibels below the peak of the major lobe. Moreover, as indicated by the envelope 42 the minimum intensity occurring at the 180 degree phase angle is more than 50 decibels below the peak of the major lobe. It is accordingly apparent that a very important increase in directional discrimination is attained by the use of the square law area of variation principle. This increase in discrimination may be employed to produce more effective filtering with a diffraction grating structure of a given superficial area and cost or it may be utilized to reduce the number of elements and the cost of a diffraction grating filter with reference to the area and cost of a filter utilizing equal area elements.

Fig. 8 shows the results obtained with a diffraction grating filter in which the areas of the individual elements are varied in accordance with a sine law. This graph is plotted so that the major lobes 44 and 45 may be compared with lobes 31 and 34 respectively of Fig. 7. The minor lobes 46 and 47 have peak intensities of the order of 23 decibels less than the major lobes. This arrangement therefore does not yield quite as high a discrimination between the major lobe and the first minor lobe but it does have the advantage that in the central portion of the range as will be observed by referring to the envelope 48 the intensity falls to a magnitude 60 decibels below that of the major lobe. Since it is possible as has already been explained by a suitable design of the filter to orient the diffracted beams to the most favorable angular position this sinusoidal distribution affords a means of securing a very high discrimination between the desired energy of the first order diffraction and undesired energy at a position or angle substantially removed therefrom.

Fig. 9 discloses a system in which the reflection grating is given a concave conformation to enable it to replace both the plane diffraction grating of the preceding figures and the converging lens employed therewith. It is well known that in the case of light if a point source be positioned on a circle having a radius of curvature $$\frac{R}{2}$$

having a center at the central point of a spherical grating facing the circle and having a radius of curvature R, the various frequency components will be separated from each other by diffraction and will fall at different points on the circle at which the point source lies. (See Wood's Physical Optics, New and Revised Edition 1928, pages 231 to 236, inclusive.) This principle is employed in the system of Fig. 9 in which $T_1$, $T_2$, $T_3$ and $T_4$ represent transmitting sources similar to those of the systems previously described. The transmitters are connected to a common line 1 which terminates in a compressional wave emitting element 50 which may be of piezoelectric type. A series of energy absorbing elements $R^1$, $R^2$, $R^3$, $R^4$ tuned respectively to the frequencies of transmitters $T_1$, $T_2$, $T_3$ and $T_4$ are arranged along the circumference of a circle passing through the element 50 and having its center at the point 51. A spherical diffraction grating 52 having a radius of curvature equal to twice the distance between element 50 and point 51 is positioned facing the array of energy absorbing elements and with its central member at the point 51. The entire assemblage of energy radiator 50, energy absorbing elements $R^1$, $R^2$, $R^3$, and $R^4$, and the spherical diffraction grating 52 is enclosed within a container 53 filled with a liquid such as castor oil. The container preferably consists of acoustic absorbing material to prevent reflections from its walls to the interior elements. It may consist of an outer shell 54 which is fluid tight with an inner screen 55 between which are retained copper shavings or copper foil saturated with castor oil. A baffle 56 is introduced in direct line between the energy radiator 50 and the energy absorbing devices to prevent direct transfer of compressional wave energy therebetween. In operation compressional waves set up in the castor oil by the compressional wave emitter 50 impinge upon the concave reflection type diffraction grating 52 and are diffracted in different directions so that waves of the frequency originating at transmitter $T_1$ impinge upon the energy absorbing member R¹ and waves of the frequencies originating at each of the other transmitters likewise impinge upon a single respective energy absorbing member. As in the case of the preceding figures each of the energy absorbing members is provided with its individual amplifier, demodulator and signal indicator. In this system as in the preceding systems the principle of utilizing maximum efficiency reflection at the center with decreasing reflection toward the outer periphery is employed. The central reflector may therefore have the form of a concave disc. The remaining reflector elements comprise annuli of spherical contour which have equal spacings between their center lines and which decrease systematically in width in accordance with the sine law from the central member to the outer member. By this expedient the major lobe for the first order of diffraction is greatly accentuated in amplitude relative to the remaining lobes.

What is claimed is:

1. A diffraction grating for reflecting waves having substantially plane wave fronts to different angles according to their frequencies comprising a grill of parallel reflecting bars having flat reflecting surfaces so disposed with respect to each other as to constitute elements of a common larger surface, the central longitudinal axes of the bars being equally spaced, the reflecting surface area of the central bar being substantially equal to the area of each of the contiguous slots between it and the adjacent bars and the remaining bars having reflecting surfaces the widths of which progressively decrease from that of the central bar to that of the outermost bars in a substantially sinusoidal fashion.

2. A diffraction grating for separating different frequency waves comprising parallel alternate transmission and non-transmission elements of substantially equal lengths, the central axes of the transmission elements being uniformly spaced and the transmission elements decreasing in area from the central element to the outer element in sinusoidal fashion with relation to distance from the center of the grating whereby the non-transmission elements increase sinusoidally from the center to the outermost element but in a converse manner.

3. The method of increasing the directive selectivity of a diffraction grating which comprises placing proximate elements so that the loci of their center points are substantially equidistant one from another, spacing the central diffractive elements from each other by about their own widths in order to obtain maximum primary order diffraction therefrom, and varying the widths of the diffractive elements to cause them to progressively diminish from the center outwardly approximately in accordance with a square law relationship.

4. The method of increasing the directive selectivity of a diffraction grating comprising paralel elements of substantially equal lengths, the central longitudinal axes of the proximate elements being uniformly spaced, which consists in spacing the central elements by such distance as to give substantially maximum diffraction effects and varying the areas of diffractive elements more remote from the center to reduce them with reference to the areas of the central diffractive elements whereby the discrimination between the major lobe of a particular order of diffracted energy with reference to a minor lobe is augmented.

5. A filter for compressional waves comprising a diffraction grating having parallel elements each provided with a face substantially aligned with corresponding faces of the remaining elements to constitute a striated surface, the separation of the central longitudinal axes of proximate elements being uniform, the width of the central diffractive elements being substantially equal to the width of the spaces intervening and the width of the outer elements decreasing from a maximum at the central part of the structure in accordance with the square of the distance therefrom to a minimum at the outermost element.

6. A diffraction grating comprising a plurality of parallel elements having one face of each aligned with the corresponding faces of the remaining elements to constitute a striated surface upon which wave energy may fall, the elements having uniform spacing between the central longitudinal axes of proximate elements, the width of the aligned faces of the elements nearest the center of the structure being greater than that of the elements more remote from the center and the width of the faces of the series of elements decreasing progressively from the center to a minimum at the outermost element.

7. A multichannel selective system for supersonic waves comprising a source of supersonic waves of different frequencies, a diffraction grating positioned in the path of a beam of waves emanating from said source, refractive means for focussing a plurality of different frequency components of a diffracted beam at respectively different points and individual compressional wave responsive devices positioned at each of said points but having energy receiving surfaces upon which the focussed diffracted beams may impinge.

8. A supersonic wave source comprising a supersonic wave energy emitting member having a substantially plane surface, the transverse dimensions of which are relatively high compared to the wave-length of the supersonic energy to be transmitted whereby a highly directive beam of supersonic energy may be emitted, a diffraction grating in the path of said beam comprising parallel elements, the central points of which are equally spaced throughout the series of elements but the widths of which progressively decrease from the central element to the outer elements, a converging lens positioned in the path of a diffracted beam from said grating, and a plurality of compressional wave responsive devices positioned respectively at the foci at which said lens causes a corresponding plurality of different predetermined frequency components of the diffracted beam to be focussed.

9. A diffraction grating comprising a plurality of parallel bars, said elements having one side of each so positioned as to constitute a striated surface, the thickness of the reflective bars thereof in the direction perpendicular to said surface corresponding to substantially one-quarter wave-length in the medium of the reflective bars for waves of a predetermined frequency in combination with a wave-responsive device sensitive to said frequency, and so positioned with respect to said grating as to receive a maximum beam of said frequency diffracted therefrom.

10. A diffraction grating comprising a plurality of parallel flat bars having their corresponding major faces aligned in substantially the same planes, the faces in one of said planes being highly polished and the distance between said faces being substantially one-quarter wavelength in the medium of the bars for waves of a predetermined frequency, in combination with a wave-responsive device sensitive to said frequency, and so positioned with respect to said grating as to receive a maximum beam of said frequency diffracted therefrom.

11. A source of wave energy comprising a means for emitting waves of substantially one frequency, a diffraction grating positioned in the path of a beam of waves emanating from said source and having a plurality of parallel bars, said bars having one side of each so positioned as to constitute a striated surface, the thickness of the reflective bars thereof in the direction perpendicular to said surface corresponding substantially to one-quarter of the wave-length of the emitted frequency in the medium of the reflective bars.

WARREN P. MASON.